(12) United States Patent
Rosenbaum

(10) Patent No.: US 10,399,825 B1
(45) Date of Patent: Sep. 3, 2019

(54) HANDRAIL CLEANING APPARATUS AND METHOD

(71) Applicant: Ori Rosenbaum, Woodland Hills, CA (US)

(72) Inventor: Ori Rosenbaum, Woodland Hills, CA (US)

( * ) Notice: Subject to any disclaimer, the term of this patent is extended or adjusted under 35 U.S.C. 154(b) by 0 days.

(21) Appl. No.: 15/978,133

(22) Filed: May 12, 2018

Related U.S. Application Data

(60) Provisional application No. 62/575,421, filed on Oct. 21, 2017.

(51) Int. Cl.
| | |
|---|---|
| *B08B 1/00* | (2006.01) |
| *B08B 1/02* | (2006.01) |
| *B65G 45/10* | (2006.01) |
| *B66B 31/02* | (2006.01) |

(52) U.S. Cl.
CPC ............. *B66B 31/02* (2013.01); *B65G 45/10* (2013.01); *B08B 1/006* (2013.01); *B08B 1/02* (2013.01)

(58) Field of Classification Search
CPC ........... B66B 31/02; B08B 1/006; B08B 1/02; B65G 45/16
USPC ................................................. 198/499, 338
See application file for complete search history.

(56) References Cited

U.S. PATENT DOCUMENTS

| | | | | |
|---|---|---|---|---|
| 3,910,400 A | * | 10/1975 | Hishitani | .................. B08B 1/02 198/338 |
| 3,946,853 A | * | 3/1976 | Ishida | ..................... B66B 31/02 198/494 |
| 4,934,512 A | * | 6/1990 | Lin | ......................... B65G 45/22 198/338 |
| 4,976,342 A | * | 12/1990 | Hwang | .................. B65G 45/22 198/495 |
| 7,854,313 B1 | * | 12/2010 | Gotsche | .................. B66B 31/02 198/495 |
| 9,833,527 B1 | * | 12/2017 | Ting | .......................... A61L 2/14 |
| 9,856,116 B2 | * | 1/2018 | Ibrahim | .................. B66B 31/02 |
| 2005/0217971 A1 | * | 10/2005 | Kim | ........................ B66B 31/02 198/338 |
| 2014/0186219 A1 | * | 7/2014 | Yukimoto | ................. A61L 2/26 422/105 |
| 2015/0049949 A1 | * | 2/2015 | Simske | .................... G06K 9/03 382/182 |
| 2017/0029250 A1 | * | 2/2017 | Thomsen | ................ B66B 31/02 |

* cited by examiner

*Primary Examiner* — Mark A Deuble
(74) *Attorney, Agent, or Firm* — Lawrence S. Cohen; Brian S. Brillett

(57) ABSTRACT

The disclosed preferred embodiment of the handrail cleaning device comprises a flexible bar which uses spring resilience force to press one or more reusable or disposable cleaning pads against the moving handrail of an escalator. The apparatus provides a lightweight, low cost apparatus that is simple to set-up and use and requires no external power. Additionally, the device is capable of cleaning and treating the handrails of common escalators during operation of the escalator. The device utilizes the motion of the escalator to perform the cleaning action. The simplicity of the device allows for multiple devices to be used simultaneously by a single operator.

24 Claims, 12 Drawing Sheets

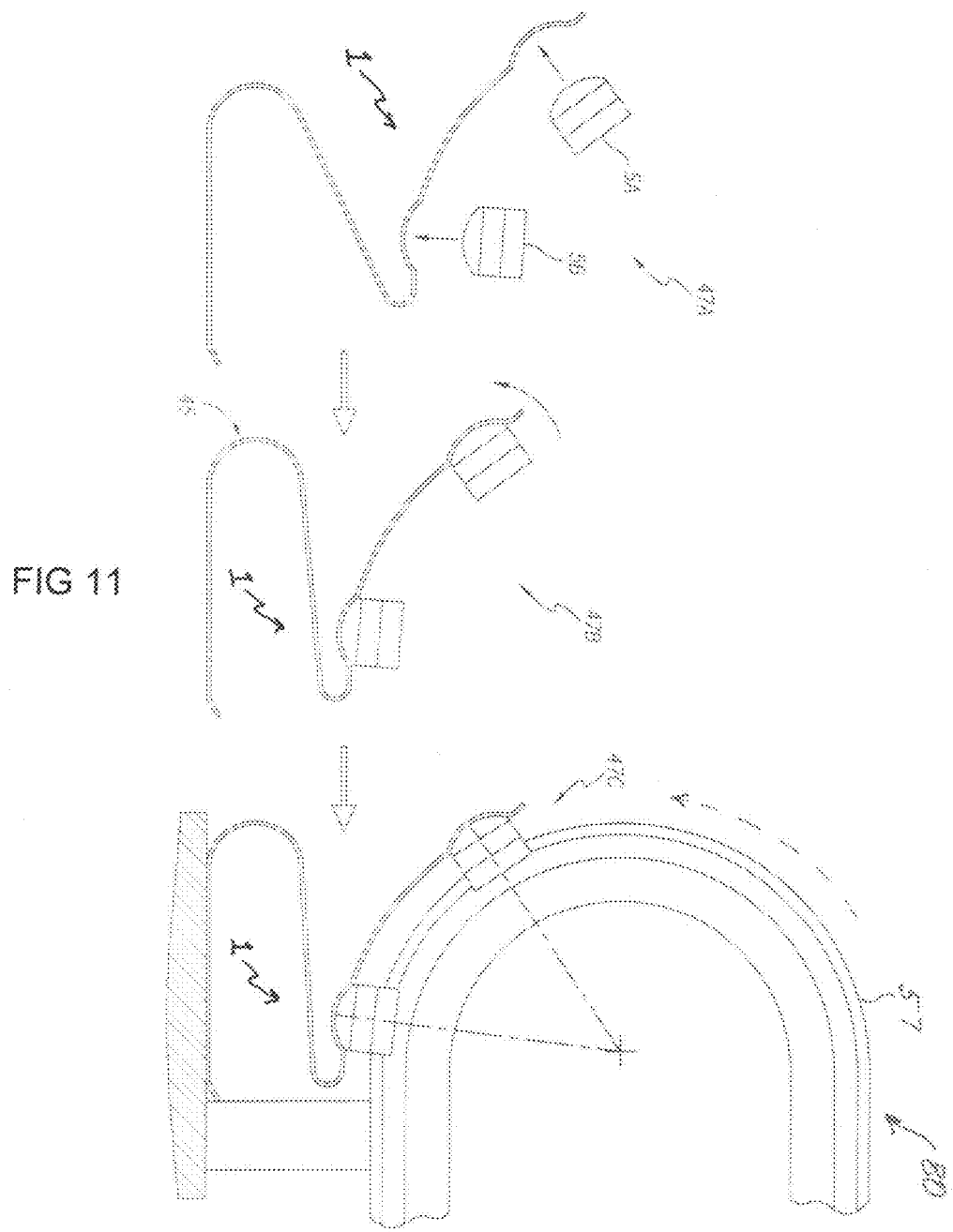

US 10,399,825 B1

HANDRAIL CLEANING APPARATUS AND METHOD

TECHNICAL FIELD

The present invention relates to cleaning of escalators and travelators.

BACKGROUND

Escalators and travelators are designed to transport high volumes of passengers. Their handrails, which are synchronized to move with the foot treads, are a safety feature intended to provide balance and support when entering, exiting and riding an escalator or travelator. Escalator and travelator handrails are constructed of flexible rubber materials which, due to the high levels of passenger traffic they endure, accumulate dirt and sludge, which has been discovered to include blood, feces, saliva, food and numerous disease-causing pathogens. Devices for cleaning the rails are of two categories. A first category provides an installed device that stays in place and operates to clean the rail. A second category provides a device that is separate from the escalator or travelator and can be moved into place for cleaning the rail. One example of the second category is in U.S. Pat. No. 9,856,116, the entire content of which is incorporated into this application by reference.

BRIEF DESCRIPTION OF THE DRAWINGS

FIG. 11 is a time progressive view of the steps for placing the rail cleaning assembly into position.

DETAILED DESCRIPTION

Figure 1:
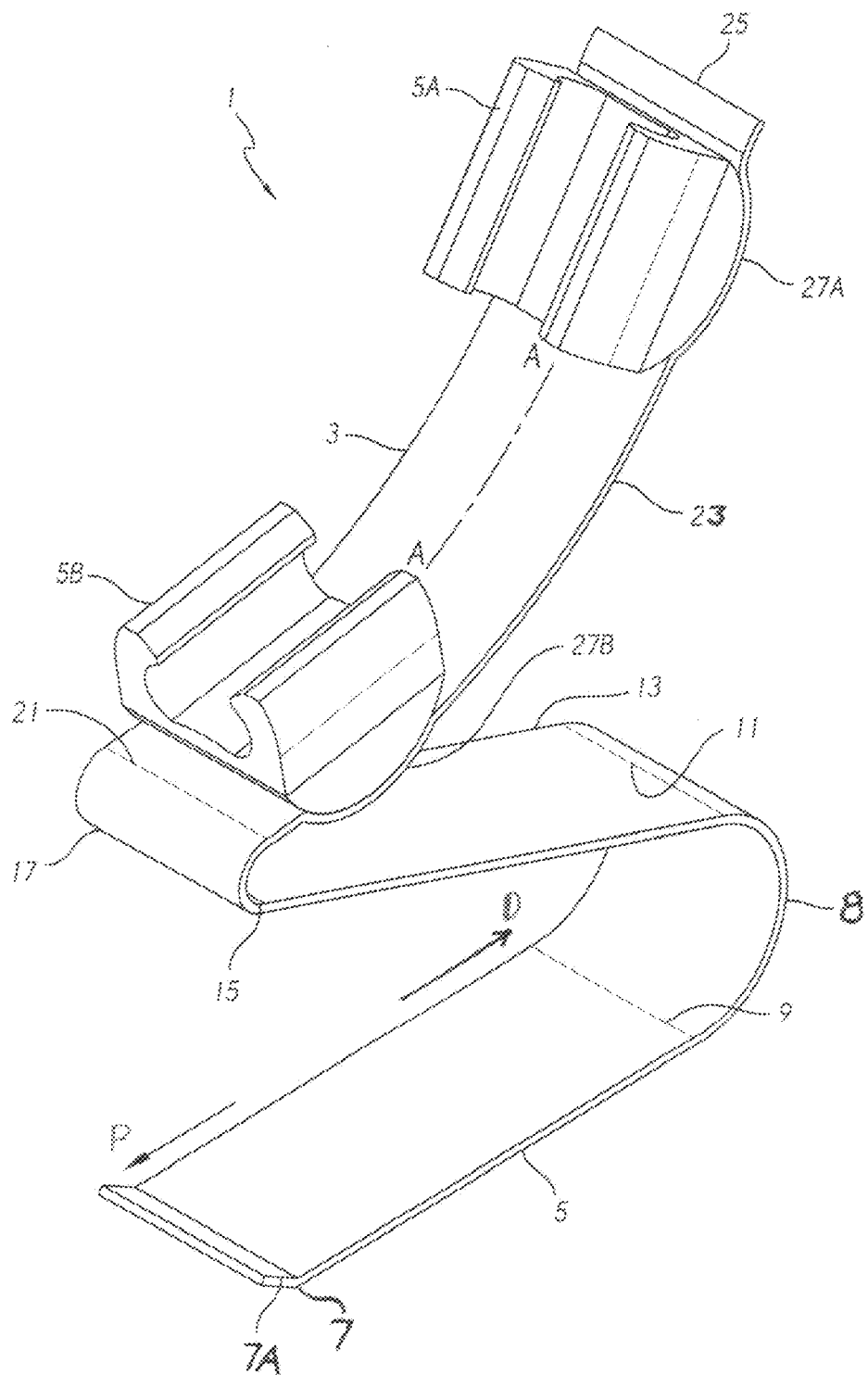
FIG. 1 is an isometric view an embodiment of the handrail cleaning assembly.

The following description relates to both escalators and travelators and therefore the term "an/the escalator(s) and a/the travelator(s)" is used to refer separately to each of them. While they are referenced together as one and the other, the meaning to be read is to each of them separately. If for any reason one of them is an incorrect reference, the other is retained. If there is any occurrence that only one of an escalator or travelator is intended to be referred to, then that one will be stated alone. Also, any content taken from an outside reference that may refer to one or the other of an escalator or travelator will be stated as in the source.

The parts of the escalator and the travelator that are relevant to this description have some level of inexact common meaning or complexity, such as the words "newel" and "balustrade" which describe parts of the apparatus at each end of an escalator and a travelator.

For example, in the MITSUBISHI ELECTRIC Glossary at:

http://www.mitsubishielectric.com/elevator/overview/e_m_walks/glossary.html the terms are defined as:

Balustrade: The side of an escalator (moving walk) extending above the Steps (Pallets), which includes Skirt Guard, Interior Panel, Deck Board and Moving Handrails.

Newel: Extensions of the Balustrade at each end of the escalator (moving walk) that assist passengers when boarding and landing.

As will be understood in the following description, the embodiments of the invention as described herein are all implemented preferably to function at the exit end of an escalator and a travelator. This implementation contributes to having the cleaning pads be in an enhanced contact with the handrail, by being drawn in by the handrail in addition to restoration of the flexure of the device. Therefore, for purposes of this description, the handrail and the use of the rail cleaning assembly are at the exit newel of an escalator and a travelator. The subject apparatus of the escalator and the travelator at the exit end will have a moving handrail which in the exit configuration transitions from a substantially straight line of movement into in a curved movement from an upper arriving position (upward facing posture) curving down into a lower return position (downward facing posture). The embodiments of the invention as described herein engage in contact with the handrail at a point at which it has entered into the curved movement. The description of the invention embodiments herein uses the terms resilience and resiliency to describe the restoring force of members of the rail cleaner assembly that are flexed when it is put into position for use on a handrail. That resilience/resiliency allows the rail cleaner assembly to be located and self-adjust to numerous handrail configurations, applying such pressure through the cleaning pads as to accomplish effective cleaning. The terms self-adjust and self-adjusting refers to the functional feature accomplished by the available interactive flexure of a plurality of members of the rail cleaner assembly.

The description of the handrail cleaning device comprises in one embodiment a continuous flexible resilient bar called a spring arm having a plurality of self-adjusting flexible members which are each put into a flexed condition in use and which uses the restoring resiliency to provide a resulting self-alignment to press one or more reusable or disposable cleaning pads against the moving handrail of an escalator and a travelator. In one embodiment, there are two such cleaning pads. The embodiments described herein provide a lightweight, low cost apparatus that is easy to transport by hand, simple to set-up and use and requires no external power. Additionally, the device is capable of cleaning and treating the handrails of common escalators and travelators during operation of the escalator and the travelator. The device utilizes the motion of the escalator and the travelator to perform the cleaning action in concert with the one or more cleaning pads. The simplicity and small size of the device allows for multiple devices to be used simultaneously by a single operator. The device can be hand carried so as to be conveniently moved for example, from a storage place, or being brought into the location. The lightweight and small size also allow very convenient usage arrangements. It can be easily carried to its position for use at the escalator and the travelator. It does not need a carrying apparatus to be moved around and positioned. It is of such size that two of them can be used, one on each side of an escalator and a travelator at the same time, or by moving a single device into alternative positions. The size is sufficiently small that an adjoining apparatus for cleaning the treads can also be placed in operating position, with the present rail cleaning device on one or both sides of the escalator and the travelator.

The configuration of the spring arm allows by self-alignment consistent contact of cleaning pads to the handrail by the plurality of self-adjusting flexible parts of the handrail cleaning device. In addition, it is the case that escalators and travelators are not made in an exact uniform configuration. Although they have the common general feature at the exit assembly (also for information, the entrance assembly) at which the moving handrail goes from an upward facing posture around a curve to a substantially downward facing posture; the exact path of travel between those two postures varies, that is the curvature and return path of the handrail varies from one installation to another. One variation that is commonly seen, at least in illustrations, is in which the transfer from upward facing posture to downward facing posture is a 180 degree circle, but that is not uniformly the way these devices are made. Thus, as will be understood the present invention provides for cleaning handrails of different travel paths due to the self-adjustment that it provides so that, in the exemplary embodiments, two spaced apart cleaning pads have angular position and sufficient pressure to each function for cleaning effect on the handrail as it passes by them.

The embodiments now to be described provide at least two and up to three members of the spring arm to provide the flexing and consequent resiliency. Those at least two and up to three separate flexures operate by their separate self-adjustment together to accomplish the self-alignment and pressure of the cleaning pads on the handrail. In addition, the cleaning pads can be manually angularly adjusted for optimal cleaning contact with the handrail.

As will be described, there are two primary flexing portions. One, called a vertical flexing portion causes the cleaning pads to move substantially vertically down and up. The second, called the radial flexing portion causes the cleaning pads to move substantially in a radial direction. The step of flexing the device causes both of these flexing movements in mutual conjunction. A third flexing portion having a smaller amount of flexure available is a curve adjustment flexing portion, and this portion may not flex in all cases. Finally, for the final fitting of the cleaning pads to the handrail, the cleaning pads are adjustably attached to the spring arm which adjustment is done at the point either or both just before or just after the spring arm is released to have its final cleaning posture in contact with the handrail.

Figure 2:
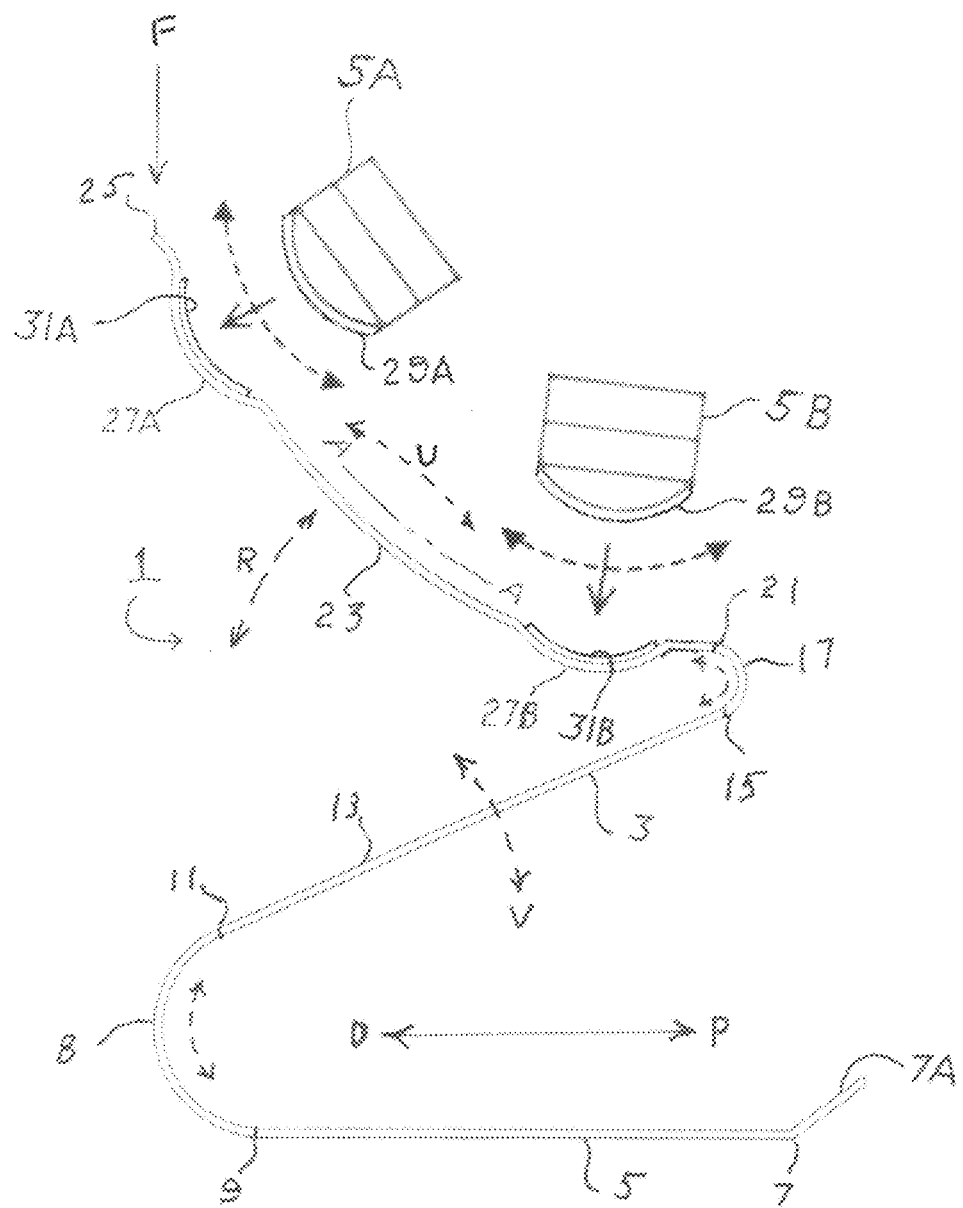
FIG. 2 is a side view of the handrail cleaning assembly of FIG. 1.

FIGS. 1 and 2 show an exemplary embodiment of the rail cleaning assembly 1 which for convenience is given a designated proximal direction P (also regarded as front) and distal direction D (also regarded as rear) in which the proximal direction P refers the rail cleaning assembly facing to (proximate) the escalator and the travelator and the distal direction D refers to a direction facing away (distal) from the escalator and the travelator. The embodiment of the rail cleaning assembly now described comprises a spring arm 3 made of one continuous piece of flexible resilient material and a pair of cleaning pads, which are an upper cleaning pad 5A and a lower cleaning pad 5B. The cleaning pads 5A and 5B and their adjustable attachment to the spring arm 3 will be later described in implemented detail.

As will be understood the point of joinder from one part to the next part of the spring arm 3 are termed points of merger or continuity of the single piece comprising the spring arm 3. The spring arm 3 has a floor plate 5 having a proximal end 7 and a distal end at a point of merger 9. Also in FIGS. 1 and 2 there is shown a bumper 7A defining the proximal end of the floor plate 5, the bumper being considered an optional feature. From the point of merger 9 of the distal end of floor plate 5, extends a first curvature 8 defining a vertical position adjusting curve, curving upward from the point of merger 9. terminating facing generally proximally, at an upper point of merger 11 to an upper plate 13 defining a vertical adjusting arm, extending proximally from the upper point of merger 11 to a proximal end 15. From the proximal end 15 of the vertical adjusting arm 13 extends a second curvature 17 defining a radial adjusting curve, curving upwardly and distally to a point of merger 21 to an upper arm 23 defining a handrail curve adjusting arm that extends in a wide curve both upwardly and distally to an upper termination 25. The handrail curve adjusting arm 23 has a pair of spaced apart pad rocker seats, an upper pad rocker seat 27A and a lower pad rocker seat 27 B which are curved along a length axis A-A of the upper arm 23 so as to facilitate angular adjustment of cleaning pads 5A and 5B fitted to them. Mounted on the handrail curve adjusting arm 23 on the pad rocker seats 27A and 27B are the cleaning pads 5A and 5B. The clean pads 5A and 5B have curved bottom surfaces of common curvature with the pad rocker seats to facilitate angular adjustment. The angular adjustment is affected by a hook and loop fastener in which one component 29A and 29B is one the respective cleaning pads 5A and 5B, and the other component 31A and 31B is on the respective rocker arms 27A and 27B. A set of arrows shows how the cleaning pads are placed on and adjusted to the rocker arms.

The vertical position adjusting curve 8 and the vertical adjusting arm 13 comprise the vertical flexing portion which has a flexing path as shown by arrow V in FIG. 2. The radial curve 17 and the upper arm 23 comprise the radial flexing portion which has a flexing path as shown by arrow R in FIG. 2.

In use of the illustrated embodiment the flexing and resulting resiliency is provided at least by two of the spring arm portions operating in conjunction; the vertical position adjusting curve 8 and the radial adjusting curve 17 in which the vertical adjusting curve 8 flexes to vertically tilt the vertical adjusting arm 13 to a vertically lower position taking with it the rest of the spring arm structure and the radial adjusting curve 17 flexes to tilt the upper arm 23 downward. It is also helpful, but not essential that the upper arm 23 be able to flex, or at least be available to flex, thereby providing a third flexing portion of the spring arm 3 to operate in conjunction. Such flexing of the upper arm 23 is designated by the dotted arrow U in FIGS. 2 and 4. It is then appreciated that upon being flexed to a fitting posture to facilitate positioning to a handrail and then released, the resilience of the remaining degree of flexure will operate to provide pressing of the cleaning pads against the handrail for effective cleaning action.

Although this embodiment has a spring arm of a single continuous piece, it is understood that it can be made of separate pieces and in such case the flexing and resilience of the pieces can be selected for action to accomplish the flexing in which case a supply of varied pieces can be made to make the system more exactly measured to engage a particular escalator and travelator newel. Also, the cleaning pads can be adjustably fitted to the spring arm by other means such as mechanical fasteners.

Figure 3:
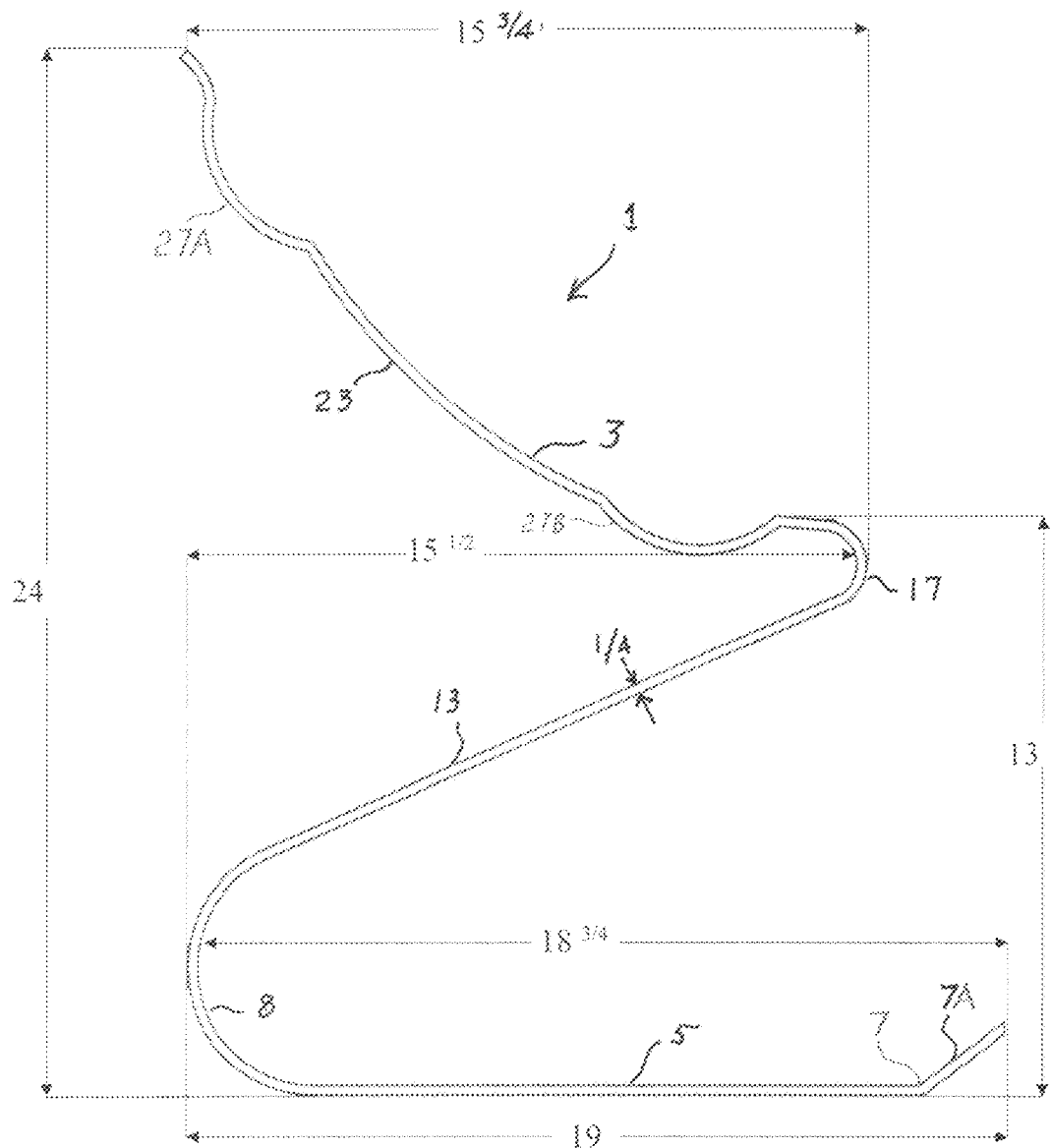
FIG. 3 is a side view of the spring arm with exemplary dimension

FIG. 3 shows construction of the spring arm 3 in its relaxed, unflexed shape with exemplary dimensions for fitting to a wide range of current escalators and travelators. The dimensions are approximate and can vary in a range such as 2 to 3 inches for working on a variety of escalators and travelators newel configurations. The spring arm 3 as constructed in its unstressed shape can be said to have a double reversed shape. In this it is meant that the floor plate 5 extends in a first direction from the bumper 7 distally to the first curvature 8 which reverses the direction so that the upper plate 13 extends proximally which defines a first reversed shape structure, and then the second curvature 17 reverses the direction again so that the upper arm extends distally and upwardly defining a second reversed shape structure. These are not exact reversals as can be seen, but the flexing in conjunction by the first curvature 8 and the second curvature 17, changing the directional extension makes available changes in the shape of the rail cleaning assembly 1 so as to effect positioning and adjustment of the positioning of the cleaning pads when applied to an escalator and a travelator exit assembly for cleaning the rail. In addition to the embodiment of two flexing members in which flexure is provided by the first curvature 8 and the second curvature 17, in a further embodiment having three flexing members, the upper arm 23 is itself curved in a manner to allow it to flex so that the spaced apart cleaning pads will be positioned equally to the handrail. Each embodiment also allows the cleaning pads to be angularly adjusted in the rocker seats using the hook and loop fasteners to make the adjustment so as to best match the handrail. The cleaning pad shape, construction and cleaning surface is designed to absorb liquid cleaning solutions such that the pad will provide effective cleaning. The pads may thus also be used to apply treatments to the handrails such as disinfectants or protective treatments to maintain the appearance and durability of the handrails.

Figure 4:
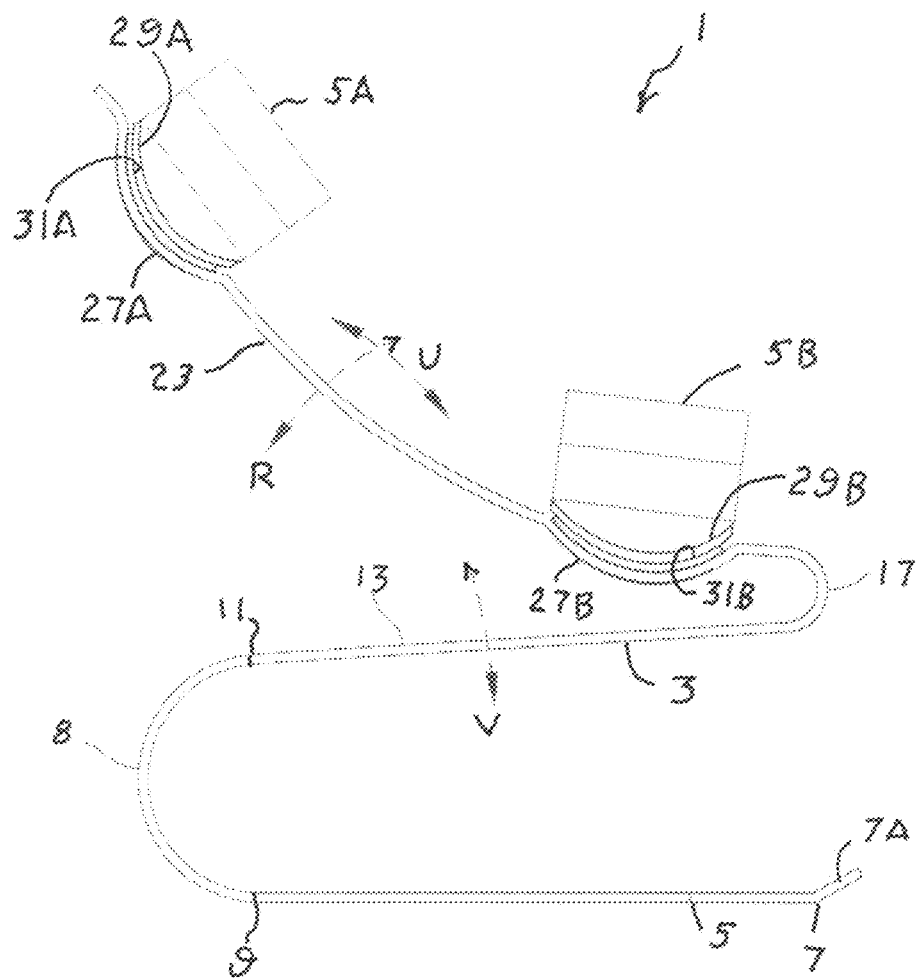
FIG. 4 is a view of the embodiment of FIGS. 1 and 2 in a flexed posture.

FIG. 4 shows the rail cleaning assembly 1 in a flexed posture exemplary of the flexing action by each of the flexing members in preparation for movement into position at a handrail. This is demonstrated by a force F pushing down on the curve adjusting arm 23 which rotates the curve adjusting arm 23 downward about the radial adjusting curve 17 (arrow R). Also. the vertical position adjusting curve 8 has been flexed downwardly (dotted arrow D) to adjust downward the vertical position adjusting arm 13 (dotted arrow V). Also, in this illustration, the upper arm 23 is considered as having flexed to a straighter posture (dotted arrow S) It will be appreciated below that in putting the rail cleaning assembly 1 into position, it is flexed so as to allow it to be put into an overly flexed posture, and then released to allow the resiliency to make the fit of the cleaning pads to the handrail with a desired amount of pressure to the handrail for effective cleaning.

In summary it can be appreciated that the spring arm allows at least two and up to three resilient flexing adjustments that function together and then with the added adjustment of the angle of the cleaning pads, to allow the spring arm assembly to adjust to the various shapes presented by the moving handrails of different construction with the residue resilience providing the force needed to press the cleaning pads into position on the handrail.

In various embodiments, the cleaning pads are an assembly that have a structural member that is shaped to fit on the handrail to be cleaned. There are in the industry different handrail dimensions, but within a fairly limited set of common variations from manufacturers. Therefore, the structural member can be made in a variety of dimensions to fit the various common handrail dimension, thereby allowing universal use by selecting the pad made for the particular handrail. The cleaning pad structural member is a semi-rigid flexible resilient material which allows it to deform when being positioned on a moving escalator and travelator handrail so as to match the cross-sectional shape of the handrail thereby giving effectively full cleaning contact to the handrail. Exemplary of such embodiment is a foam construction. The sponge-like deformability of such cleaning pads gives them the ability to distort as being installed at the handrail and to reform around the handrails after installation to effectively surround the handrail portion to be cleaned. As described below, in an exemplary embodiment a covering assembly is applied to the structural member which has a cleaning surface that effects the cleaning contact to the handrail. The cleaning surface of the pads thus remains in contact on all sides of the handrail during cleaning operation, in particular, including the surfaces touched by escalator and travelator users. As the dirt is cleaned from the hand rail and transferred to the cleaning pad, the hand rail is cleaned. The cleaning pads may be removed, cleaned and reused by reattaching them to the spring arm.

The cleaning pad structure, material and shape are chosen so that the pad provides enough pressure on the sides to clean them, while the spring arm provides pressure for cleaning the flat or top portion of the hand rail.

Figure 5:
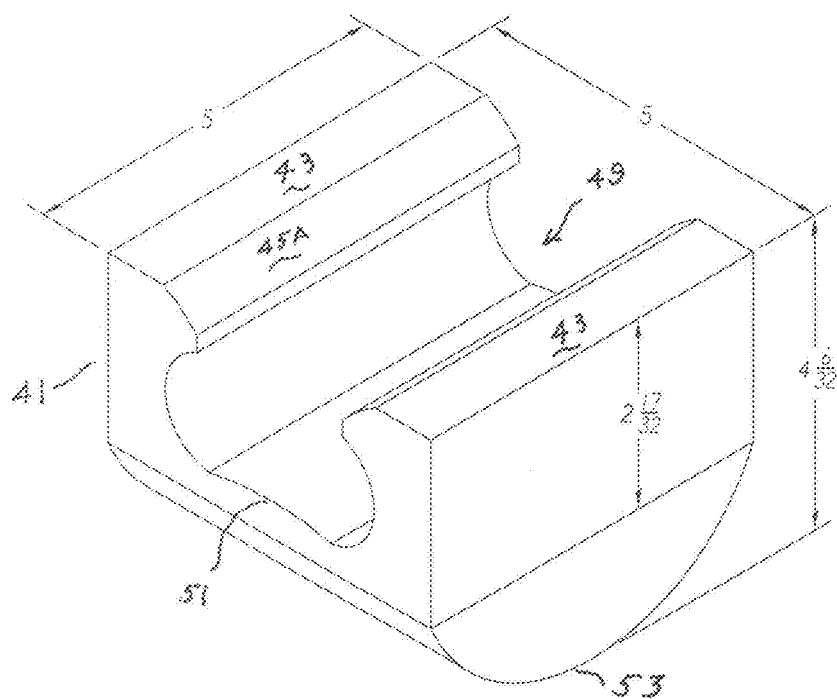
FIG. 5 is an isometric view of an embodiment of a cleaning pad.
Figure 6:
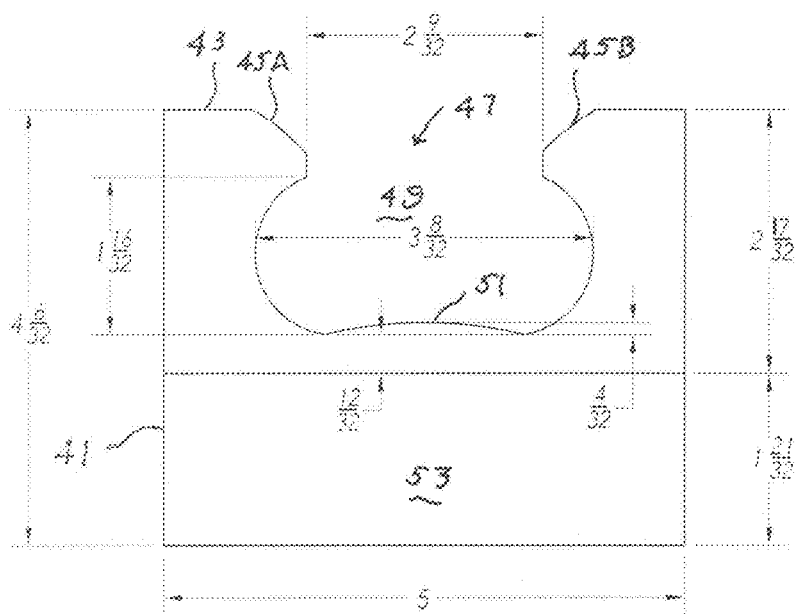
FIG. 6 is an elevation view of the cleaning pad of FIG. 5.

FIGS. 5 and 6 show the cleaning pad structural member 41 along with exemplary dimensions intended for indicating the relative size of 5 inches wide, 5 inches long and 4 3/16 inches high. Viewed from the front or back as in FIG. 6 it presents a rectangular configuration, while the side view shape can be seen in FIG. 5. The top 43 of the cleaning pad structural member 41 has a pair of opposing entry slopes 45A and 45B presenting an opening 47. Below the opening 47 is a wider cavity 49 shaped to receive the hand rail. At the bottom (actually the top of the handrail) of the cavity 49 is a bump 51 of selected height, such as 1/8 inch. The bump 51 provides for added cleaning pressure on the top of the handrail. The sides of the cavity 49 have a curvature to match the curvature of handrails. There is a sloped bottom 53

Figure 7:
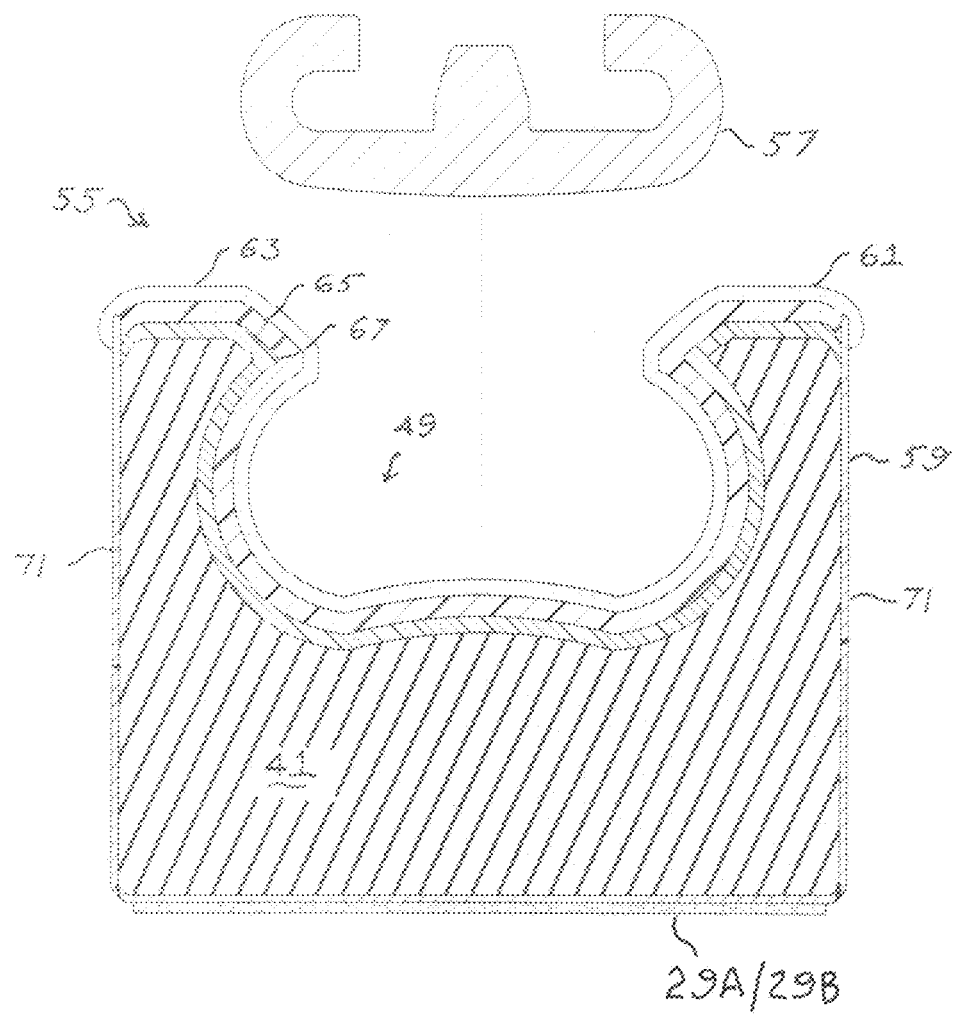
FIG. 7 is a sectional view of a cleaning pad assembly with a handrail in attachment position.
Figure 8:
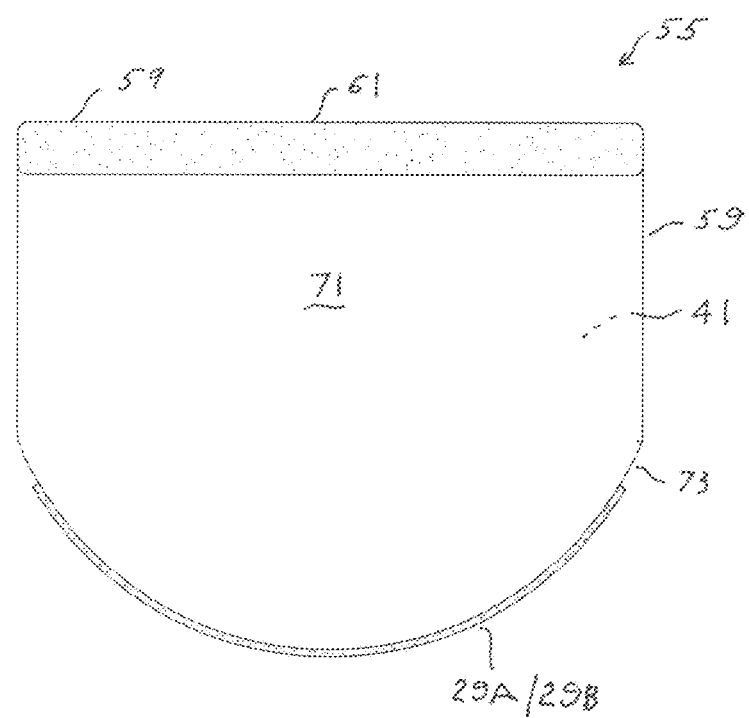
FIG. 8 is a side view of the cleaning pad assembly.

Referring to FIGS. 7, 8, 9, 10 and 11 the cleaning pad assembly is shown. FIG. 7 shows in section the cleaning pad assembly 55 along with a typical handrail configuration 57. The cleaning pad assembly 55 has a fabric cover 59 which is wrapped around the structural member 41. Along the top and into the cavity 49 there is a three layered cleaning action portion 61. It has an outer layer 63 of microfiber, a middle layer 65 of sponge material and a lower layer 67 of a cover material such as nylon. This triple layering will provide for good cleaning contact on the handrail and good control of cleaning liquid. Referring to FIG. 8. the fabric cover 59 has side members 71 that can have elastic ends for allowing putting it on and taking it off conveniently. The hook and loop component 29A and 29B is integrally made part of the fabric cover, curving around the bottom of the cleaning pad assembly.

Figure 9:
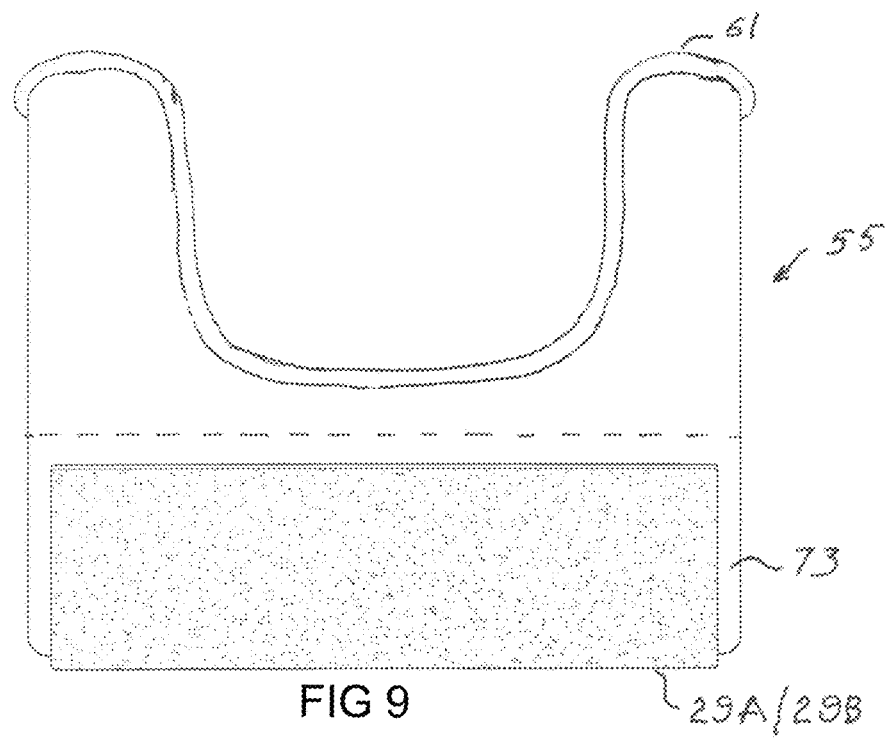
FIG. 9 is a front view of the cleaning pad assembly

As shown in FIG. 9, a front fabric face 73 extends down from the cleaning action portion 61 and slopes around the bottom carrying the hook and loop component 29A/29B that is used to fit onto the mating hook and loop component on the rocker seat 27A/27B.

Figure 10:
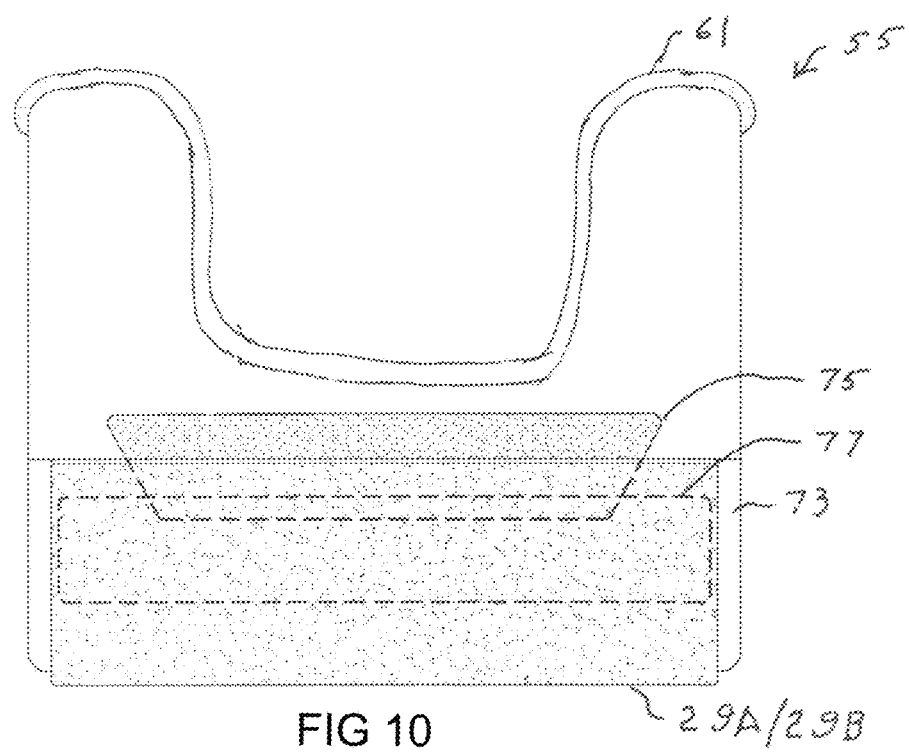
FIG. 10 is a rear view of the cleaning pad assembly

As shown in FIG. 10, at the rear of the cleaning pad assembly, front fabric face 73 terminates and is held in place by a set of hook and loop components 75 and 77.

Also, it can be seen in FIGS. 9 and 10 that the cleaning action portion 61 is fitted to be sufficiently loose to allow the engagement with the handrail for good contact for cleaning.

FIGS. 9 and 10 show cleaning action portion 59 loosely fitted to the shape of the structural member 41 and in the cavity so as to readily conform to the shape of the handrail.

FIG. 11 shows the process of installing an embodiment of the handrail cleaning apparatus onto an escalator and a travelator in a step-by-step diagram. In first, step 47A the cleaning pad assemblies 5A and 5B are placed on the curved rocker seats 27A and 27B at a best estimated angle for engagement with the handrail of the escalator and the travelator exit newel 80. This is basically bas shown in FIGS. 1 and 2. In the second step 47B the spring arm is flexed downward, thereby implementing the vertical movement of vertical flexing portion and the radial movement of the radial flexing portion as explained above, to a position sufficiently lowered to be moved into position at the handrail. This is basically as shown in FIG. 4. Also, at this point the cleaning pad assemblies can be angularly adjusted. In the third step 47C the spring arm is allowed with a controlled release to have the cleaning pad assemblies be at a position closely adjacent to the handrail 57 so as to observe the angular positioning of the cleaning pad assemblies, and then if needed to further adjust them. Finally, the cleaning pads are pressed into full engagement of the handrail inside the cleaning pd space.

Figure 12A:
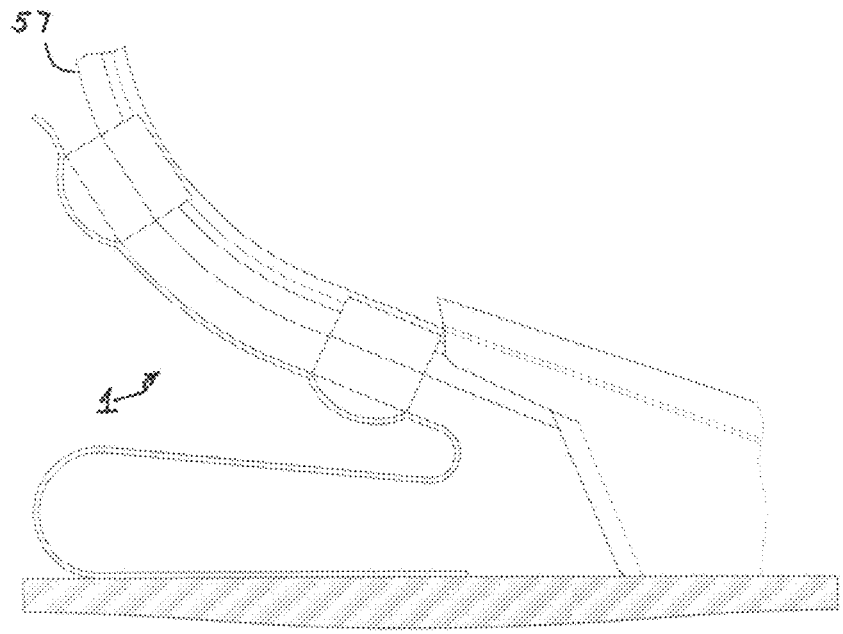
FIGS. 12A, 12B and 12C are exemplary alternative configurations of escalator and travelator newel constructions showing the varying flexed positions of the rail cleaning assembly as required.
Figure 12B:
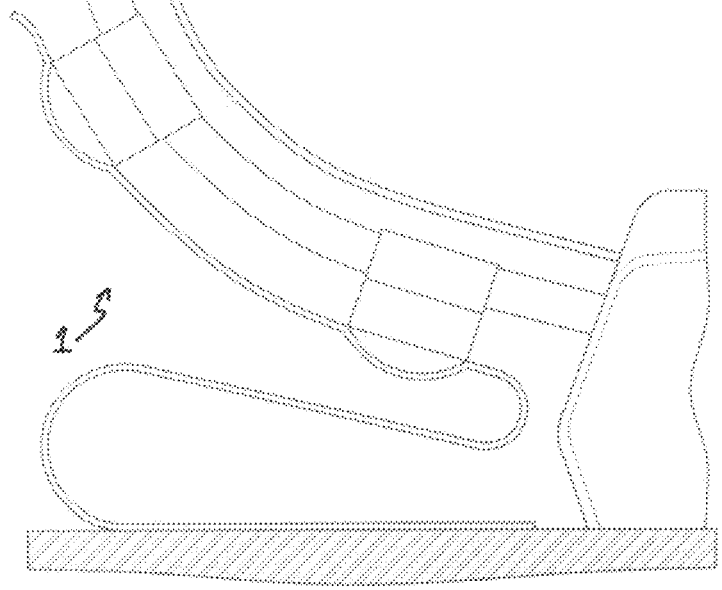
Figure 12C:
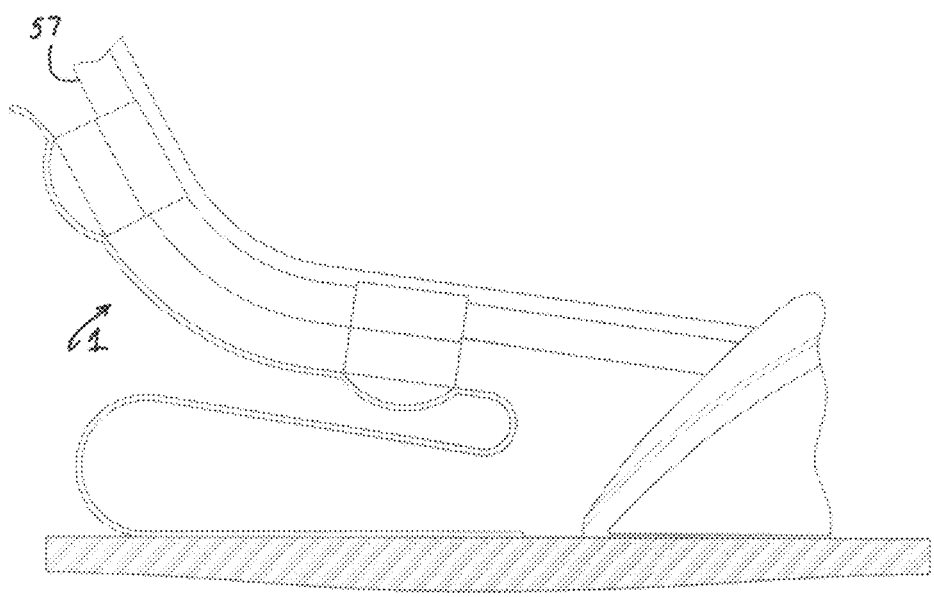

FIGS. 12A, 12B and 12C are exemplary of different configurations of the escalator and the travelator exit assembly such that the travel of the handrail 57 takes different paths, and therefore requires a different final fitted flexed configuration of the spring arm 3 of the handrail cleaning assembly 1. These different handrail paths demonstrate the how the plurality of different flexing paths cooperate to allow fitting to numerous if not every possible reasonably designed handrail path.

A full cycle or rotation of a single-story escalator typically takes about one minute. Most escalator handrails, however, will require multiple cleaning rotation cycles. During use of the apparatus, an initial restorative cleaning may require multiple cleaning cycles and multiple cleaning pads for effective cleaning of accumulated dirt. After cleaning by the apparatus, a conditioning solution can be applied with the device cleaning pads to improve the handrails aesthetics, and to protect them against UV light degradation or oxidation. The apparatus may also be used to apply a disinfectant, antibacterial or sterilization solution to the hand rail to reduce bacteria, germs, viruses and other potential pathogens.

In various embodiments, a variety of cleaning, conditioning and disinfection solutions may be offered and utilized with the device, some with potential long term antimicrobial additives for longer term benefits. Virtually any liquid solution can be used or applied with this device.

Figure 13A:
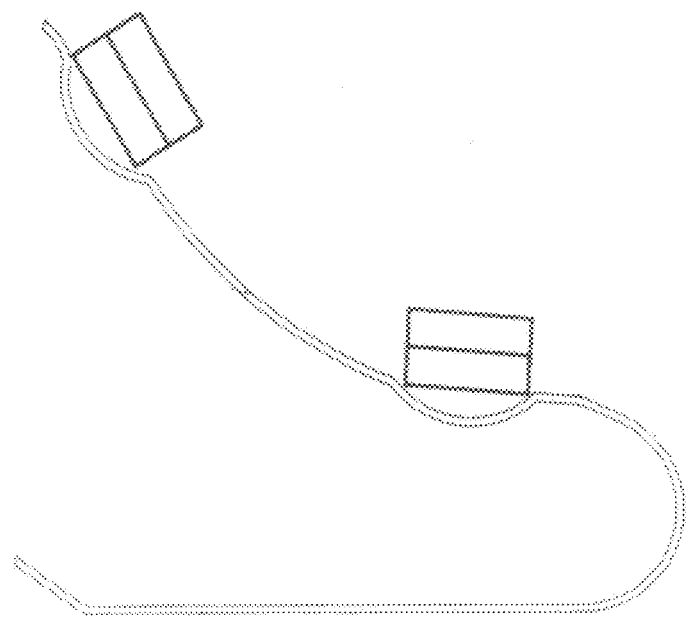
FIG. 13A is an alternative embodiment of the rail cleaning assembly
Figure 13B:
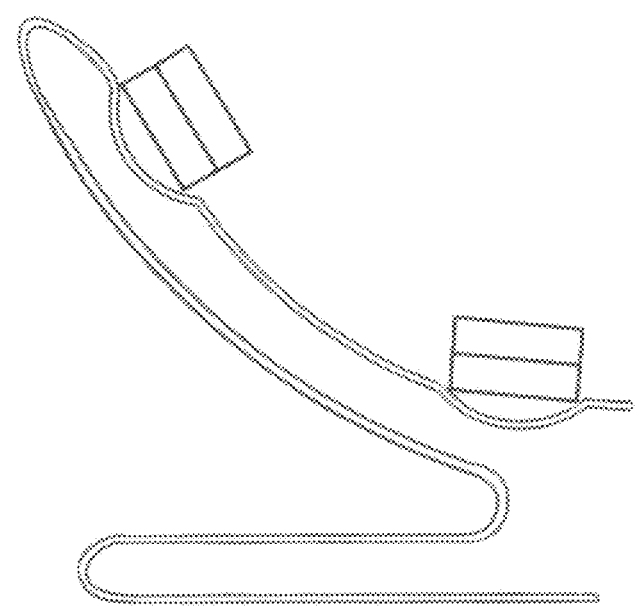
FIG. 13B is an alternative embodiment of the rail cleaning assembly

In alternate embodiments, the spring arm may be constructed of plastic, spring metal, fiberglass or a mechanical spring. Alternative embodiments are shown in FIGS. 13 and 14 with a single and triple bend of in the spring arm. Various configurations are possible that can hold one or more cleaning pads against the moving handrails with an appropriate amount of pressure while the handrails move through the cleaning pads.

Various embodiments are available for removably attaching the cleaning pads to the spring arm. For example, mounting prongs may be formed directly of the spring arm or attached to it that allow the cleaning pads to mount to the spring arm by sliding between the mounting prongs. Various mounting configurations may be utilized without the bent spring arm system that still allow for angle adjustability.

In alternative embodiments, the cleaning pads may have incorporated angles in their structure which allow for angle adjustability. Alternatively, the pads may be provided with accessory separate and removable wedge components of various wedge angles which provide a foam base that allows for the cleaning pads to flex or compress into better alignment with the handrail.

In alternative embodiments, the cleaning pads may be provided in the apparatus with various configurations. In one configuration, a single piece design is provided which includes a permanently mounted cleaning surface, such as a microfiber surface. In another version, the cleaning surface material in wrapped or slid onto the cleaning pad in a sock-like configuration, where the cleaning material may be removed for cleaning and reuse.

In alternative embodiments, the cleaning pads may be constructed of just sponge material without the addition of a microfiber cover or integrated surface. The use of sponge alone is a simpler configuration and may also effectively clean the handrails.

In alternative embodiments, newly developed cleaning materials may be utilized instead of the microfiber material.

In an alternate embodiment, a paper based, disposable, or pre-saturated removable cleaning cloth or material may be mounted onto the cleaning pads. A pre-moistened product similar to "wet-naps" may be provided which are retrieved individually from a container which includes the cleaning solution. The cleaning surfaces are thus conveniently disposable and pre-conditioned with cleaner.

In alternative embodiments, the rocker mounting structure may be configured according to the other mounting methods discussed above. The cleaning pad may also utilize a hard base, such as plastic to mount to the spring arm mechanically. In these embodiments, the cleaning pads may use a mechanical link such as an adjustable snap-lock, channel, track, hinge or glide system. Each of these alternative mechanical connection methods allow the cleaning pad to pivot into alignment with the handrail.

In various embodiments, the number of cleaning pads is variable. In various alternative embodiments, a single larger of several smaller cleaning pads may be utilized in conjunction with the spring arm.

In an alternate embodiment, the cleaning pad construction may be molded from a flexible plastic or foam materials.

In various configurations, the system and apparatus may be used as just a cleaning device, as a conditioning device, or as a disinfectant apparatus.

What has been described herein is considered merely illustrative of the principles of this invention. Accordingly, it is well within the purview of one skilled in the art to provide other and different embodiments within the spirit and scope of the invention.

I claim:

1. A device for cleaning a handrail at an exit newel of an escalator and a travelator during operation of the escalator and the travelator comprising:

a spring arm;

one or more cleaning pads;
  wherein the one or more cleaning pads are removably affixed to the spring arm, wherein the cleaning pads are deformable and shaped to firmly mate with a rubber portion of the handrail, wherein the spring arm has a flat portion which is placed on the floor adjacent the exit newel, wherein the spring arm maintains pressure on the one or more cleaning pads against the handrail during operation of the escalator and the travelator.

2. The device as in claim 1 wherein the cleaning pads are covered in a microfiber cleaning material.

3. The device as in claim 1 wherein the cleaning pads are removably affixed to the spring arm by hook and loop fastener components affixed to the cleaning pad and to the spring arm.

4. The device as in claim 1 wherein the spring arm is configured to have two bend points which provide a deformable configuration which may be depressed for mounting on the escalator and the travelator and providing a resiliency upon placement of the cleaning pads on the handrail.

5. The device of claim 1 wherein the cleaning pads are disposable.

6. The device of claim 1 wherein the cleaning pads have a tapered opening to facilitate mounting on the handrail.

7. The device as in claim 1 wherein the spring arm has a vertical positioning portion and a radial positioning portion which function independently and together allow the spring arm to have the cleaning pads in pressure when applied to the handrail.

8. The device as in claim 1 wherein the cleaning pads are covered in a disposable pre-moistened cloth material.

9. A method for cleaning an escalator and a travelator handrail comprising:
  providing a cleaning apparatus to an escalator hand rail comprising:
    a spring arm;
    one or more cleaning pads; wherein the one or more cleaning pads are removably affixed to the spring arm, wherein the cleaning pads are deformable and shaped to firmly mate with the rubber portion of the handrail, wherein the spring arm comprises at least a vertical positioning portion and a radial positioning portion;
  placing the cleaning apparatus in a position relative to the handrail at an exit newel of the escalator and the travelator that both of the vertical positioning portion and the radial positioning portion are in a flexed posture adjacent to the handrail such that the cleaning pads can be adjusted;
  adjusting the cleaning pads for optimal fit on the handrail;
  placing the cleaning pads into position on the moving handrail; and
  releasing flexure on the spring arm such that resiliency of the spring arm is transmitted to the cleaning pad assemblies to have cleaning pressure on the handrail.

10. The method of claim 9 wherein there are two cleaning pads spaced apart on the spring arm.

11. The method of claim 10 wherein the cleaning pads are covered in a microfiber cleaning material defining cleaning pad assemblies.

12. The method of claim 11 wherein the cleaning pad assemblies are removably affixed to the spring arm by hook and loop fastener components affixed to the cleaning pad assemblies and to a spring arm location for receiving them, the spring arm location having a curvature defining a rocker seat at which one component of the hook and loop fastener is attached and the cleaning pad assemblies have a curved bottom that match the curve of the rocker seat and has the other component of the hook and loop fastener on the curved bottom, whereby angular adjustment of the cleaning pad assemblies relative to the handrail can be done to provide optimal fit of the cleaning pad assemblies to the handrail for cleaning effect.

13. The method of claim 9 wherein the spring arm is configured to have two bend points which provide a deformable configuration which may be flexed for mounting on the escalator and the travelator and providing an upward force of the cleaning pads on the handrail.

14. The method of claim 9 wherein the cleaning pads are disposable.

15. The method of claim 9 wherein the cleaning pads have a tapered opening to facilitate mounting on the handrail.

16. The method of claim 9 wherein the cleaning pads are covered in a disposable pre-moistened cloth material.

17. An escalator and a travelator cleaning apparatus that has a self-adjustable spring arm operable to enable at least one cleaning pad to contact the handrail of the escalator and the travelator that have different constructions of the exit newel as the handrail curves from its upward facing position around a curved reversing portion comprising:
  a spring arm of a single continuous length made of a flexible resilient material having;
    a floor resting length which is substantially flat adapted to be oriented on a floor adjacent to the handrail to be cleaned and having a length extending away from the handrail to a distal end;
    a vertical position adjusting curve merging at the distal end of the floor resting length and curved to a substantially opposite direction where it merges to a vertical adjusting arm which is adapted to extend toward the handrail to a proximal end the proximal end having allowed vertical movement substantially by flexing of the vertical position adjusting curve and a radial adjusting curve merging from the proximal end of the vertical adjusting arm and an upper arm defining a merging from the radial adjusting curve and extending distally upwardly to a distal termination and the upper arm having at least one mounting position for mounting a cleaning pad and a cleaning pad mounted on the at least one mounting position;
  whereby flexing of the spring arm by a downward force at the distal termination provides flexing of both the vertical adjusting curve and the radial adjusting curve such that the upper arm will self-adjust upon release of the downward force to bring the cleaning pad into cleaning position at the handrail.

18. The escalator and the travelator cleaning apparatus of claim 17 wherein the upper arm has at least two cleaning pads which are spaced apart on the upper arm.

19. The escalator and the travelator cleaning apparatus of claim 18 wherein the at least two pads are mounted on the upper arm with an adjustable fastening apparatus that will allow angular adjustment of the cleaning pads with respect to the upper arm.

20. A method of cleaning the moving handrail of an escalator and a travelator wherein the handrail moves at an exit newel from a substantially upward facing position around a curve to a substantially downward facing position comprising:
  providing a handrail cleaning device comprising:
    a spring arm of a single continuous length made of a flexible resilient material having;

a floor plate length which is substantially flat adapted to be oriented on a floor adjacent to the handrail to be cleaned and having a length extending away from the handrail to a distal end;

a vertical position adjusting curve commencing at the distal end of the floor resting length and curved to a substantially opposite direction where it is attached to a vertical adjusting arm which extends toward the handrail to a proximal end the proximal end allowed vertical movement substantially by flexing of the vertical position adjusting curve and a radial adjusting curve commencing at the proximal end of the vertical adjusting arm and an upper arm curving upwardly away from the handrail a selected degree of curvature to a distal termination the upper arm having at least one mounting position for mounting a cleaning pad;

a cleaning pad mounted on the at least one mounting position;

placing the spring arm in a position relative to the handrail wherein flexing of the vertical adjusting curve and the radial adjusting curve results in the at least one handrail cleaning pad being in cleaning contact position to the handrail;

maintaining the cleaning pad in the cleaning contact position as the handrail operates to pass by the cleaning pad to effect cleaning contact of the cleaning pad to the moving handrail.

21. The method of claim 20 wherein the cleaning pad is a cleaning pad assembly having a cleaning pad structural member that is a polymer foam material and having a fabric cover on the structural member wherein the fabric cover has a cleaning contact portion located for cleaning contact with the handrail, and the cleaning contact portion has an exterior microfiber fabric.

22. The method of claim 21 wherein there are two cleaning pad assemblies mounted spaced apart on the upper arm.

23. The method of claim 22 wherein the upper arm has two spaced apart rocker seats each having an angularly adjustable fastener for fastening the cleaning pad assemblies in an angularly adjustable position and the cleaning pad assemblies are mounted on the angularly adjustable fastener whereby angular adjustment can be implemented in order to have the cleaning pad assemblies be in optimal cleaning contact with the handrail.

24. The method of claim 20 further wherein the upper arm provides flexing of its curvature.

* * * * *